United States Patent [19]

Djabbarah

[11] Patent Number: 4,703,797
[45] Date of Patent: Nov. 3, 1987

[54] SWEEP IMPROVEMENT IN ENHANCED OIL RECOVERY

[75] Inventor: Nizar F. Djabbarah, Richardson, Tex.

[73] Assignee: Cities Service Co., Tulsa, Okla.

[21] Appl. No.: 831,717

[22] Filed: Feb. 21, 1986

Related U.S. Application Data

[63] Continuation-in-part of Ser. No. 566,462, Dec. 28, 1983, abandoned.

[51] Int. Cl.$^4$ .................... E21B 43/24; E21B 43/22; E21B 47/00
[52] U.S. Cl. .................................. 166/252; 166/272; 166/273; 166/274; 166/294; 252/8.554
[58] Field of Search .................. 166/252, 272–275, 166/294, 303; 252/8.55 D, 307

[56] References Cited

U.S. PATENT DOCUMENTS

| | | | |
|---|---|---|---|
| 3,275,552 | 9/1966 | Kern et al. ............... | 252/8.55 B |
| 3,330,351 | 7/1967 | Bernard .................... | 166/309 X |
| 3,376,924 | 4/1968 | Felsenthal et al. ....... | 166/273 X |
| 3,529,668 | 9/1970 | Bernard .................... | 166/275 X |
| 3,669,898 | 6/1972 | Butler ....................... | 252/307 |
| 3,893,511 | 7/1975 | Root .......................... | 166/274 X |
| 4,127,383 | 11/1978 | Johnston et al. ......... | 252/307 X |
| 4,235,290 | 11/1980 | Kalfoglou ................. | 166/273 |
| 4,445,573 | 5/1984 | McCaleb ................... | 166/250 |
| 4,488,598 | 12/1984 | Duerksen ................. | 166/252 |
| 4,495,995 | 1/1985 | Chen et al. ............... | 166/273 |

Primary Examiner—George A. Suchfield
Attorney, Agent, or Firm—George L. Rushton; William N. Patrick; John W. Carpenter

[57] ABSTRACT

A method for sweep improvement during enhanced oil recovery in a subterranean oil-bearing formation concerns the generation of foam by the dispersion of the displacing fluid in an aqueous solution of a mixed surfactant system. The mixed surfactant system comprises a lignosulfonate foaming agent and a surfactant foaming agent.

22 Claims, 4 Drawing Figures

FIGURE 3. FOAM QUALITY MEASUREMENTS OF VARYING CONCENTRATIONS OF SURFACTANTS AND LIGNOSULFONATES.

FIGURE 3. FOAM QUALITY MEASUREMENTS OF VARYING CONCENTRATIONS OF SURFACTANTS AND LIGNOSULFONATES.

FIGURE 4. FOAM STABILITY MEASUREMENTS OF VARYING CONCENTRATIONS OF SURFACTANTS AND LIGNOSULFONATES.

SWEEP IMPROVEMENT IN ENHANCED OIL RECOVERY

This application is a continuation-in-part of application Ser. No. 566,462, filed Dec. 28, 1983, and now abandoned.

BACKGROUND OF THE INVENTION

This invention concerns enhanced oil recovery processes which involve the displacement of oil by the injection of a gas or dense fluid through an injection well in order to produce oil at a production well. More particularly, this invention concerns improving the sweep of the recovery process by the generation of foam. The utility of the invention lies in the improvement in sweep efficiency when used in enhanced oil recovery processes. Sweep efficiency is broadly defined as volume of formation swept/total volume.

The use of a gas, a dense fluid, or a mixture of gases to displace and recovery oil from subterranean formations is well known. For example, U.S. Pat. No. 2,866,507 teaches a method for improving oil recovery by gas drive through the injection of an aqueous slug containing a surfactant having foam-producing characteristics. The aqueous slug is immediately followed by the gas drive. U.S. Pat. No. 3,185,634 teaches improved oil recovery by the simultaneous injection of a gas and a liquid containing a foaming agent. U.S. Pat. No. 3,318,379 teaches a method of improving oil recovery by introducing into the reservoir a slug containing a foaming agent, followed by a non-aqueous and surfactant-free slug, followed by a gas slug. U.S. Pat. No. 3,344,857 teaches a method for oil recovery by injecting carbon dioxide between two aqueous slugs. Each of the aqueous slugs contains a surfactant. U.S. Pat. No. 3,376,924 teaches a method for oil recovery by the injection of a surfactant slug, followed by a gas drive, forming a foam bank. After further oil production, the production well is shut in, and gas is injected until the formation pressure at the production well approximately equals the injection well pressure. Then the gas injection is stopped, and production is resumed. This method offers a spring-like compression and expansion on the foam.

The use of foam to improve the sweep efficiency of the displacing fluid involves the utilization of two foam properties. The first is the high resistance to flow that is associated with foam. The second property is the high gas-liquid surface area. Thus, only relatively small amounts of an aqueous solution of a foaming agent need be used with relatively large amounts of gas or dense fluid. The gas disperses in the liquid, generating a large interfacial area and a large volume of foam, thereby increasing the resistance to flow. If this resistance to flow is in those regions of the reservoir where the resistance is least, then the displacing fluid is forced to flow through regions of higher resistance, sweeping larger portions of the reservoir and recovering larger quantities of oil. Thus, the use of foam improves sweep efficiency.

In spite of the large gas-liquid surface area which is associated with foam, large quantities of a foaming agent are required and may be attributed to one or more of the following: large pore volume of the reservoir, losses due to adsorption on rock surface, partitioning to oil, and decomposition at reservoir conditions. The result is high cost. In many instances, this cost becomes so high that the process is rendered economically unattractive.

SUMMARY OF THE INVENTION

My invention makes the foaming process more efficient, not only by reducing the adsorption loss of the foaming agent but also by reducing the injection requirements of the foaming agent, even in the absence of adsorption losses.

My invention concerns a method for improving the sweep efficiency of an enhanced oil recovery process in a subterranean oil-bearing formation by using the steps of:

(a) introducing a displacing fluid into the formation through an injector well, such that the fluid flows through regions of least flow resistance, thus contacting oil and displacing it, (b) monitoring the displacing fluid volume/displaced oil volume ratio, (c) injecting an aqueous slug comprising a mixed system of a surfactant foaming agent and at least one lignosulfonate foaming agent when the fluid/oil ratio reaches a pre-determined value, said slug flowing through regions of least flow resistance, comparable to the flow pattern of the displacing fluid, (d) resuming injection of the displacing fluid, such that the newly-injected displacing fluid contacts and disperses throughout the aqueous mixed system slug, thus generating foam, said foam resulting in an increase of flow resistance such that the displacing fluid flows through regions of higher flow resistance, contacting and displacing new oil, and, (e) recovering the displaced oil.

DETAILED DESCRIPTION OF THE INVENTION

This invention pertains to processes which employ foam to improve the efficiency by which the displacing fluid sweeps the reservoir and contacts and recovers oil.

Various oil recovery processes are known and used in the industry, such as waterflood, fireflood, micellar flood, gas drive, miscible flood, and polymer flood. As noted in the prior art, the foam process is also known and used. Under typical reservoir conditions of temperature and pressure, the foam is comprised of thin films of a liquid which are separated by the displacing fluid, which is either a gas or a dense fluid. A reference book which described the structure and the properties of foam is "Foams" by Bikerman; Springer-Verlag.

Figure 3:
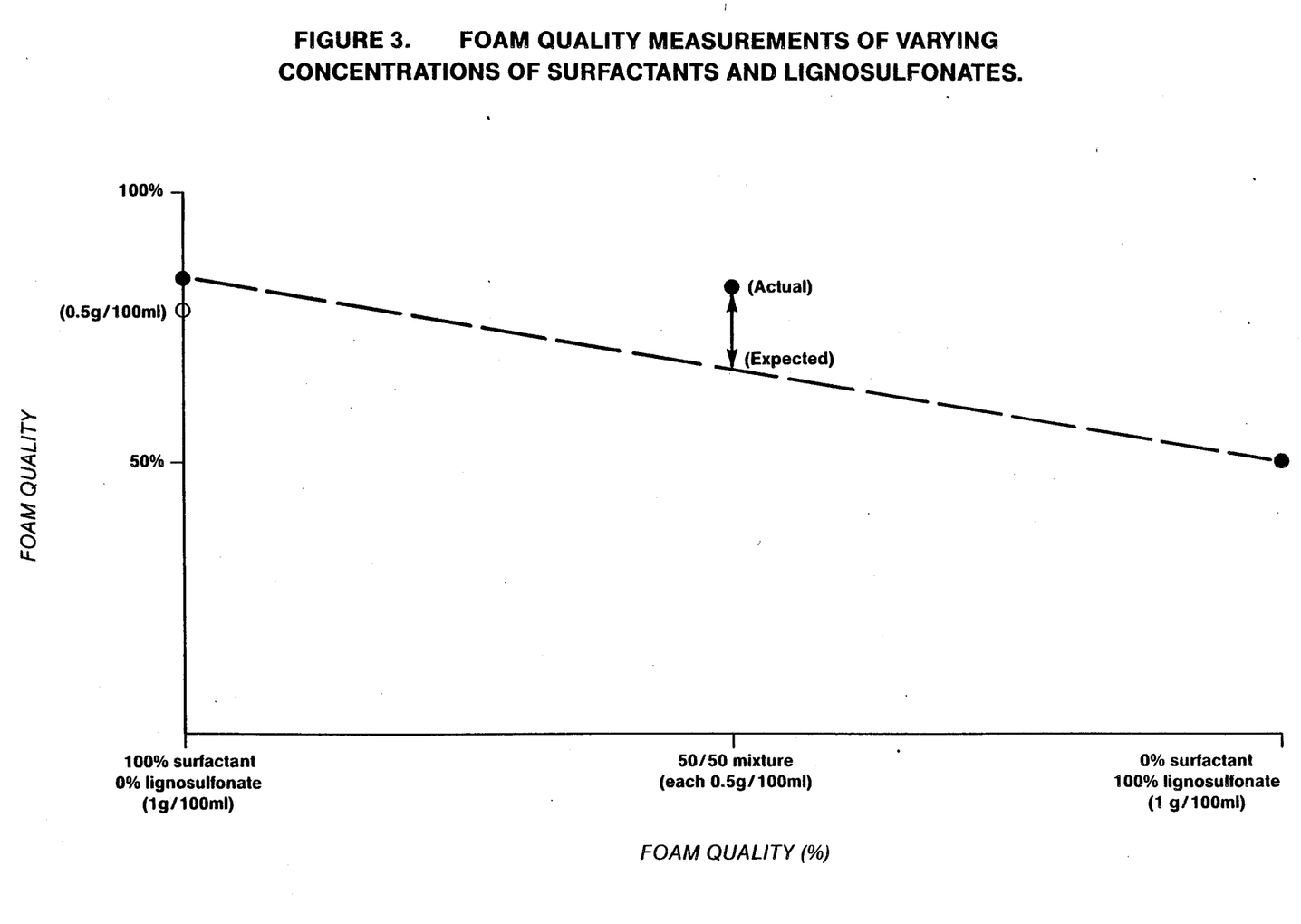
FIG. 3 is a graph detailing the unexpected, but definite, improvement of Foam Quality of the present invention.
Figure 4:
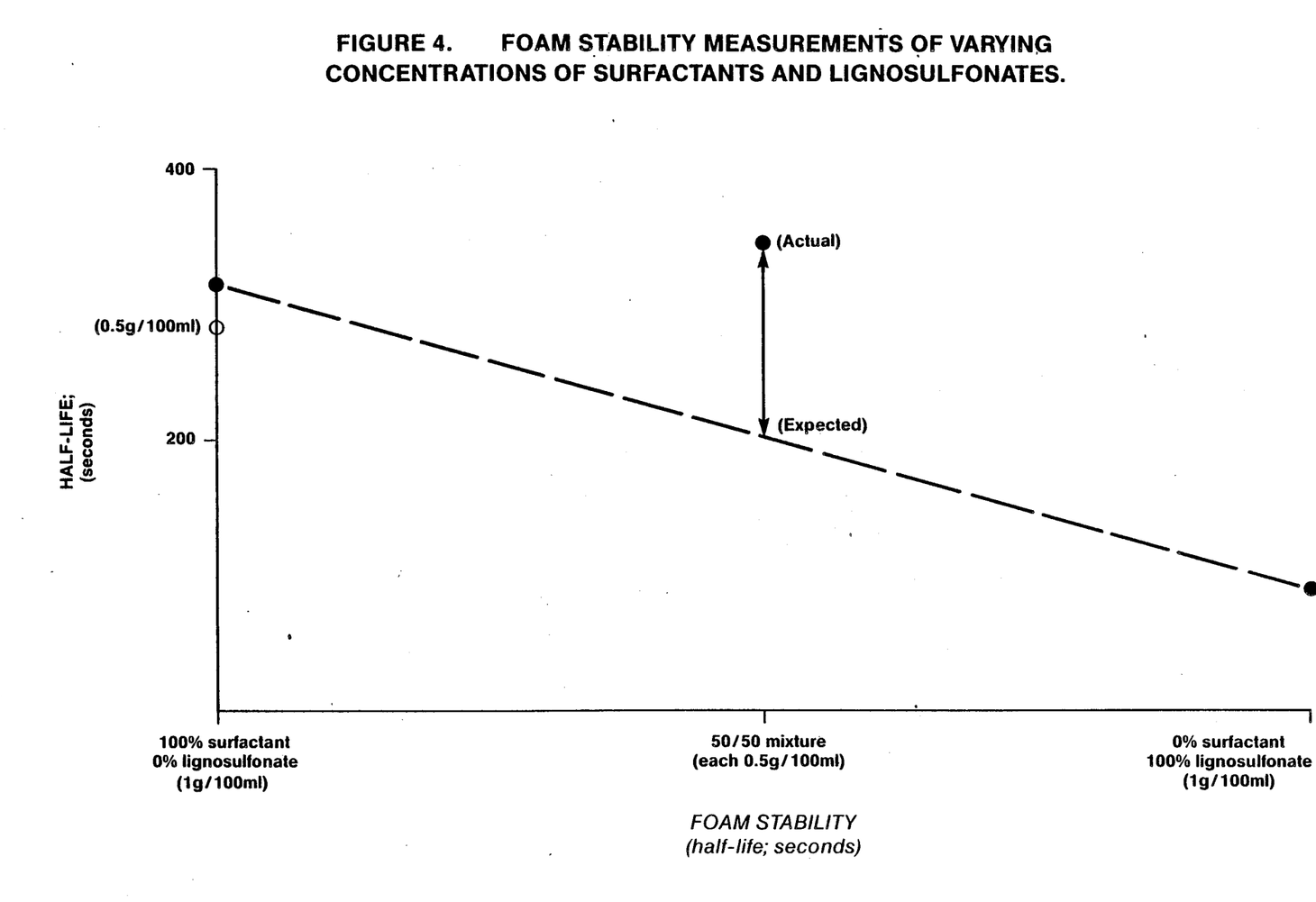
FIG. 4 is a similar graph detailing the unexpected, but definite, improvement of Foam Stability of the present invention.

It has been my discovery that a surfactant foaming agent, or a surfactant foaming agent and a foam stabilizer, can be partially replaced by a lignosulfonate foaming agent without significant loss of performance. Foam stabilizers are well known and are discussed in an article in "Colloid and Polymer Science", Vol. 256, pp. 1002-08 (1978). Lignosulfonates are wood by-products formed by the sulfonation of a principal constituent of wood called lignin. Lignins are complex systems of macromolecules derived from guaiacylpropanes. Additional details on structures, types and sulfonation reactions of lignins is found in ":Lignins, Occurrence, Formation, Structure and Reactions", edited by Sarkanen and Ludwig; John Wiley and Sons. Although lignosulfonates are not very effective foaming agents, when used in conjunction with and as a partial substitute for surfactant foaming agents, the resultant foam quality and stability of the mixture are almost equivalent to the surfactant foaming agent itself. As a typical example, shown in FIGS. 3 and 4, in comparing a 1% aqueous solution of an effective foaming agent such as an ammonium salt of an ethoxylated sulfated alcohol, marketed by GAF under the trade name Alipal CD-128, with an aqueous solution of 0.5% Alipal CD-128 and 0.5% of the lignosulfonate Marasperse C-21 (a product of American Can Co.), the foam quality of the mixture is about two percent less than that of the foaming agent alone. The foam stability of the mixture, as measured by the time that is required for half of the original solution to drain from the foam, exceeds that of the foaming agent by almost ten percent. The cost of the mixture is about 65 percent of that of the foaming agent.

The combination of a lignosulfonate foaming agent in the injection slug with an effective but comparatively more expensive surfactant foaming agent gives a net result of satisfactory performance at a reduced cost. This net result may be attributed to two reasons. The first reason is the preferential adsorption of lignosulfonates on reservoir rock, thus retarding the adsorption of the surfactant foaming agent and thus permitting the surfactant foaming agent to propagate farther within the reservoir. When used in this manner, the lignosulfonate acts as a sacrificial agent. Use of lignosulfonate as a sacrificial agent is well known in micellar, polymer, and micellar-polymer flooding processes, as taught in U.S. Pat. Nos. 3,700,031 and 4,235,290. However, the use of lignosulfonates as sacrificial agents in foam processes has not been described before. The second reason is the ability of lignosulfonate foaming agents to act as a partial substitute for the surfactant foaming agent, resulting in reduced cost of material without significant reduction in foaming ability and stability.

Broadly, in carrying out the process of this invention, an aqueous solution of 0.01-10.0% (weight per volume) of a mixed surfactant system is used to generate foam. This mixed system comprises at least one surfactant foaming agent and at least one lignosulfonate foaming agent. The composition of the mixed system can vary between 10-90 wt. % lignosulfonate and about 90-10 wt. % surfactant (or surfactant and a stabilizer). The surfactant foaming agent can comprise one or more foam-producing surfactants. The foaming agent can be an anionic, a nonionic, or an amphoteric surfactant with foam-producing characteristics. Anionic surfactants are those which ionize in aqueous solutions to form positively charged components, with the surface active portion being negatively charged. The surface active portion is typically a sulfate, sulfonate, carboxylate or phosphate. One class of anionic surfactants with strong foam-producing characteristics is the ammonium or sodium salts of ethoxylated sulfated alcohols, sometimes described as a salt of ethoxylate sulfate.

Nonionic surfactants are those which have little or no tendency to ionize in aqueous solutions. The water soluble part of the molecule is attracted to water by means of a hydrogen bonding which is caused by the presence of atoms of a highly electronegative element such as oxygen. One class of nonionic surfactants, with strong foam-producing characteristics, is the linear alcohol ethoxylates which are the products of the reaction of a linear alcohol, such as decanol, with ethylene oxide. One example of this class is a nonylphenoxy poly(ethyleneoxy)ethanol.

Amphoteric surfactants are those whose molecules are characterized by two functional groups such as a positively charged amino group and a negatively charged carboxyl group. One class of amphoteric surfactants with strong foam-producing characteristics is the amido betaines. One example is cocoamidopropyl betaine. The three types of surfactants are well-known.

The foaming agent is selected for a particular reservoir brine because the foam-producing characteristics are influenced by the nature of reservoir rock, such as carbonate or sandstone, the properties of the reservoir, such as temperature and pressure, and composition of the reservoir fluids, such as salinity, divalent ion concentration, pH, etc. The water used in the aqueous solution may be fresh water, produced reservoir brine, or carbonated water. A preferred method of generating the foam in-situ within the reservoir comprises injecting the aqueous slug together with or ahead of a slug of the displacing fluid. The aqueous slug can also be injected between two slugs of the displacing fluid. The size or volume of the aqueous slug varies between about 1 and 90% (vol.) of the pore volume. The size of the displacing fluid slug is dictated by reservoir size, well spacing, reservoir fluids saturation, and reservoir and rock properties. The ratio of the displacing fluid slug size to the aqueous slug size can vary between about 100:1 and 1:1. The displacing fluid can be one or a mixture of the following carbon dioxide, nitrogen, air, methane, ethane, propane, butane, hydrogen sulfide, flue or exhaust gas, or stream. A preferred displacing fluid is carbon dioxide, and, unless otherwise noted, carbon dioxide will be considered the displacing fluid in the examples.

A particularly preferred procedure for carrying out the process of this invention comprises the following steps:

1. A displacing fluid, such as carbon dioxide, is introduced into the formation at an injector well. As the injection of the fluid is continued, the fluid flows through the regions of least flow resistance, contacting the oil and displacing it. Thus, oil recovery is achieved within the shortest period.
2. When the produced gas (displacing fluid)/oil ratio approaches levels that are too high for the process to be economical, an aqueous slug comprising the mixed surfactant system, such as 0.5 wt. % of each of the surfactant foaming agent and a lignosulfonate foaming agent is injected. This slug will again preferentially flow through those regions of the reservoir where resistance of flow is least, where most of the oil was recovered as in step 1. The size of the aqueous slug is about 5% of the total pore volume.
3. Injection of the displacing fluid is resumed. Initially, the displacing fluid will flow through those portions of the reservoir where resistance to flow is least, or regions of high permeability. There the displacing fluid will disperse throughout the aqueous slug and generate foam. As more foam is generated, the resistance to flow increases in these regions of high permeability. Consequently, the displacing fluid is forced to flow through regions of lower permeability and displace additional quantities of oil. During the execution of this step, the size of the displacing fluid slug depends on the displacing fluid itself, as well as on the reservoir size, well spacings, reservoir fluids saturations and properties, and reservoir and rock properties.

4. Steps two and three may be repeated as frequently as deemed necessary, until the economics of the process become unfavorable.

The following examples are meant to demonstrate the effectiveness of the invention and are not intended to limit the scope of the invention.

EXAMPLE 1

This example is used to demonstrate that an effective but more expensive foaming agent can be partially replaced using a less effective and lower cost lignosulfonate, without significant reduction in the foaming ability and stability of the original solution. An ammonium salt of an ethoxylated sulfated alcohol, marketed by GAF Corporation under the trade name Alipal CD-128, was used as the effective foaming agent. Alipal CD-128 is marketed containing 60% of the ammonium salt of ethoxylate sulfate and is sold for about $0.70/lb. A less effective but less expensive surfactant is an ammonium lignosulfonate marketed by American Can Company under the trade name Petrolig ERA-27. It contains 52% solid lignosulfonates and is sold for $0.21 per pound. Aqueous solutions of each surfactant, and of the mixed surfactant system, were prepared. The composition of each solution is given in Table I. The foam was generated by blending one hundred ml. of each solution with air, using an Osterizer dual range blender, equipped with a precision bore graduated cylinder container, for fifteen (15) seconds. The foam height, measured from the base of the cylinder to the top of the foam, was recorded. The height of the foam-liquid interface was also recorded, as a function of time, with initial short-time measured intervals, and with the measured intervals become longer as the rate of drainage of liquid from the foam decreases. A stable foam retains its liquid component for an appreciable time, with the liquid slowly draining into the liquid volume in the container. This rate of drainage (increase in liquid volume) is an indicator of foam stability. A common index of foam stability is the time required for one-half the initial liquid volume to drain (time required for the liquid drainage to reach the level of one-half the original liquid volume). For example, if the original liquid level was at the 100 ml. mark, and, after agitation ceased, the liquid-foam interface was at the 20 ml. mark, the drainage half-life would be the time, in seconds, required for the liquid-foam interface to reach the 50 ml. mark.

The volume of the produced foam and that of the original liquid were used to calculate foam quality, defined as:

$$\text{Foam Quality} = \frac{\text{Foam Height} - \text{Liquid Height}}{\text{Foam Height}} \times 100,$$

where the foam height is the distance (or height) from the base of the cylinder container to the top of the foam, and the liquid height is the distance from the base of the cylinder container to the foam/liquid interface. Foam quality is a measure of the foaming ability of the solution.

The results of the above test are shown in Table I. These results demonstrate the lignosufonate is an ineffective foaming agent because a 1% aqueous solution produced foam with relatively poor quality and stability. The same results indicate that the ammonium salt of ethoxylate sulfate is an effective foaming agent because a 1% aqueous solution produces foam with relatively high quality and stability. Table I also indicates that when fifty percent of the ammonium ethoxylate sulfate is substituted by lignosulfonate, the resultant aqueous solution produces foam with almost the same quality and stability as that produced by the original ethoxysulfate solution. The net effect here is a 34% reduction in cost with no significant reduction in foam quality (about 2.4%) and an actual increase in foam stability (from 315 to 345 seconds).

The following examples are used to demonstrate that an effective but more expensive surfactant foaming agent can be partially replaced by using a less effective and lower cost lignosulfonate foaming agent, without significant reduction in oil recovery.

EXAMPLE 2

The tests were conducted using a parallel arrangement of two Berea cores. The dimensions and properties of the two cores are listed in Table II. A synthetic reservoir brine was used in all runs, with the brine composition listed in Table III. All tests were conducted were in a thermally-controlled hearing cabinet. The test temperature was maintained at 105° F. A system pressure of 2000 psi was maintained in all the runs. Unless otherwise stated, all compositions are in grams solute per 100 ml. solution.

A typical preparation for each run involved cleaning each core with several pore volumes of a suitable solvent. This was followed by flushing the core with several pore volumes of brine. Then, a $C_{14}$ oil was injected until no more brine was produced, and the connate water saturation was determined. Each core was then waterflooded with brine until no more oil was produced, and residual oil saturation was calculated.

The first set of core displacement experiments formed the baseline. These experiments involved the injection of carbon dioxide into the two cores, simultaneously and in parallel. Carbon dioxide injection was continued until at least 1.2 pore volumes, based on the two cores, were injected.

To insure reproducibility, each experiment was repeated at least three times. During each experiment, the amounts and fluids injected and produced, temperature, pressure, and pressure drops were monitored and recorded as a function of time. Tertiary recovery was calculated for each experiment, with tertiary recovery being defined as:

$$R_3 = \frac{(S_{or}) - (S_{of})}{(S_{or})} \times 100$$

Where
$R_3$ = Tertiary Recovery (percent),
$S_{or}$ = Residual Oil Saturation,
$S_{of}$ = Final Oil Saturation.

The amount of carbon dioxide flowing through each core was determined by direct measurement. The arithmetic averages of the results of each set of experiments were calculated and are shown in Table IV.

Figure 1:
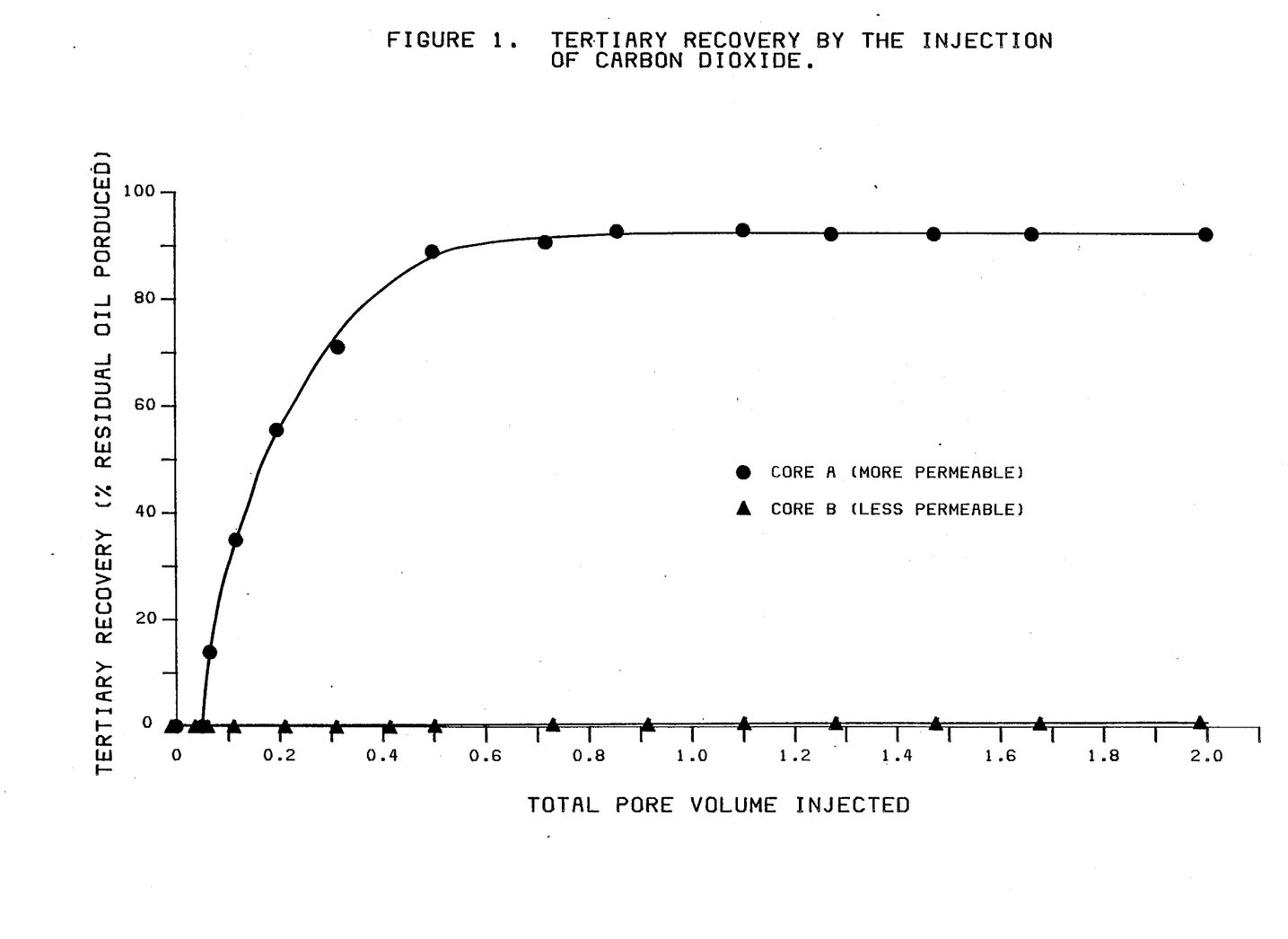
FIG. 1 is a graphical illustration of a typical laboratory flow test. It depicts percent of residual oil recovered (tertiary recovery) as a function of the total pore volume carbon dioxide injected, in two different cores.

The first set of experiments involved the injection of carbon dioxide into the two cores, simultaneously. The results of these experiments are shown in FIG. 1. The figure demonstrates that as the carbon dioxide is injected, more and more of the residual oil is being recovered from the more permeable core. This continues until practically all the residual oil is recovered from the more permeable core. In the meantime, little or no oil is being recovered from the less permeable core. At the termination of the experiment, the amount of carbon dioxide passing through each core was determined. It was found that about 4% of the injected $CO_2$ went into the less permeable core and the remaining 96% went through the more permeable. The results of this series of experiments are summarized in Table IV, Test Set A-1. They show that when only $CO_2$ is injected, it flows preferentially through the more permeable core, contacts the oil, and recovers most of it. The injected carbon dioxide, however, bypasses the less permeable core, and no oil is recovered, even after the injection of 1.3 total pore volume of the two cores. The tendency of the carbon dioxide to bypass the less permeable core did not improve after the injection of a 0.1 pore volume aqueous slug containing 1% lignosulfonate, as shown in test A-2, Table IV. The third set of "A" tests involve the injection of an aqueous slug containing 0.5 surfactant (Witcolate 1247H—an ethoxylated sulfated alcohol, manufactured by Witco Chemical Company—having strong foaming characteristics) between two carbon dioxide slugs. The injected Witcolate solution flowed through the more permeable core, and the following carbon dioxide slug initially flowed through the more permeable core, then dispersed throughout the Witcolate solution, and generated foam. This foam increased the flow resistance in the more permeable core, thus causing the residual carbon dioxide to flow through the less permeable core, contacting oil, and recovering it. As shown in Table IV, Test Set A-3, 28% of the carbon dioxide which was injected after the water slug flowed through the less permeable core.

Figure 2:
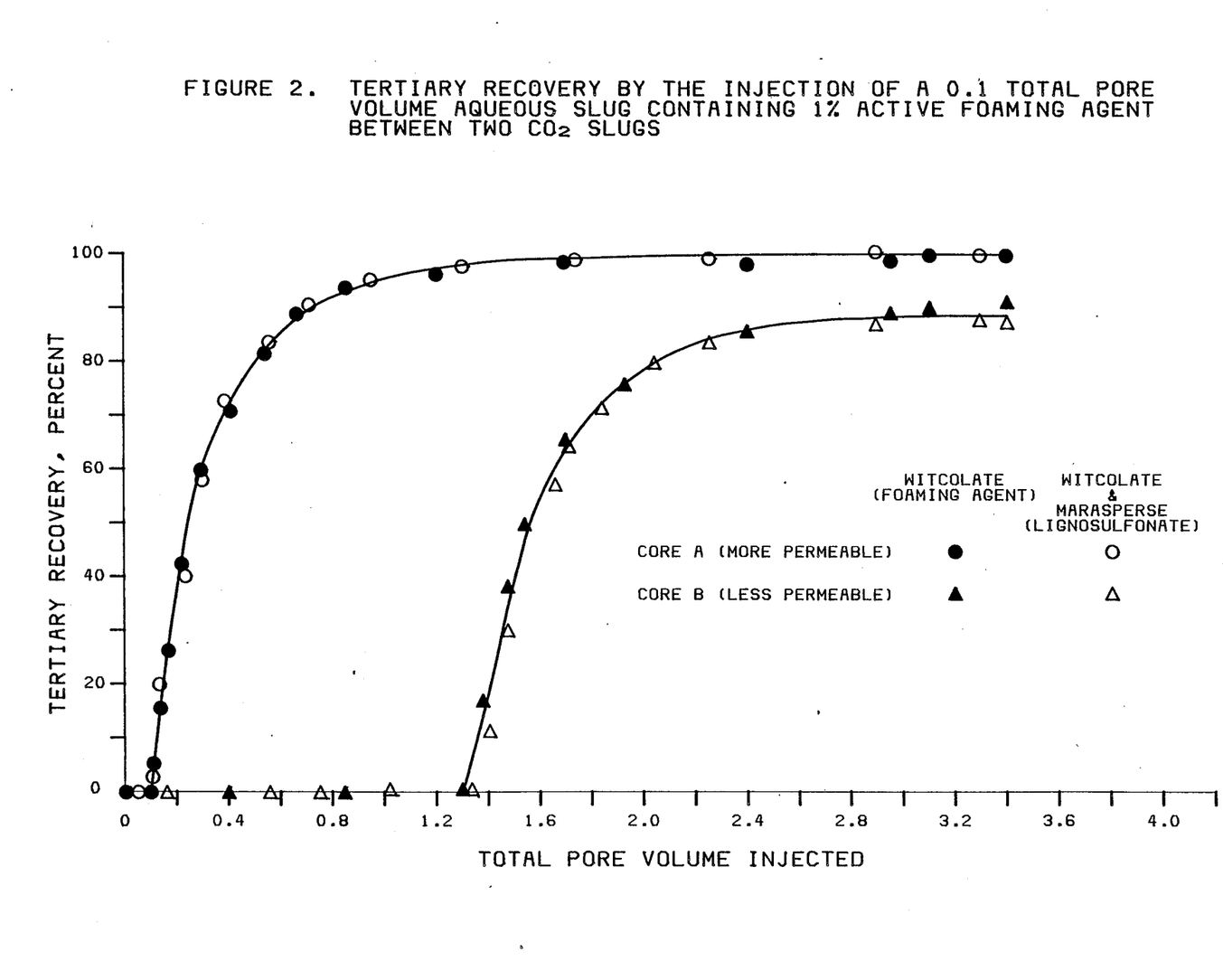
FIG. 2 is a similar illustration demonstrating how the process of the present invention improves recovery from the less permeable core.

In the fourth set of tests, the Witcolate concentration was increased to 1%. This results in greater resistance to flow in the more permeable core, with a greater amount of carbon dioxide flowing through the less permeable core, resulting in increased oil recovery. Thus, tertiary recovery rose to 91% as 44% of the total carbon dioxide injected flowed through the less permeable core. The results of this test are demonstrated in FIG. 2 and the final results are shown in Table IV, Test Set A-4.

In the final set of "A" experiments, Witcolate was partially replaced by a calcium lignosulfonate marketed by American Can Company under the trade name Marasperse C-21. Thus, an aqueous slug containing 0.5% Witcolate and 0.5% Marasperse (a total of 1% mixed system) was injected between two carbon dioxide slugs. The size of the aqueous slug and the first carbon dioxide slug was maintained at 0.1 and 1.2 pore volumes, respectively. The results are shown, in FIG. 2 and in Table IV, Test Set A-5. They indicate that the carbon dioxide distribution between the two cores and the tertiary recovery from both cores remained at practically the same level as when a slug containing 1% Witcolate was injected.

EXAMPLE 3

The series of experiments described in Example 2 is repeated at the same conditions, using the same fluids but using a different surfactant as the foaming agent. Thus a nonionic surfactant such as Igepal CO-887 is used as the primary foaming agent. Igepal CO-887 is marketed by GAF Corporation and contains 70% polyoxyethylene alkylphenols, such as nonylphenoxy poly(ethyleneoxy)ethanol. As shown in Table IV, Test Set B-1, the injection of an aqueous slug containing 1% active Igepal CO-887 between two $CO_2$ slugs results in the formation of foam and causes more $CO_2$ (32 percent more) to flow through the more permeable core, increasing recovery from zero (without the foaming agent) to 75%. In another set of experiments (Set B-2 of Table IV), if the Igepal is partially replaced by a lignosulfonate such as Petrolig ERA-27, the foam generated is approximately equally effective in diverting the $CO_2$ flow from the more permeable to the less permeable core, thus maintaining the same level of oil recovery but at a reduced cost.

EXAMPLE 4

The series of experiments described in Examples 2 and 3 is repeated, using an amphoteric surfactant as the primary foaming agent. The amphoteric surfactant is a cocoamidopropyl betaine marketed by Mona Industries, Inc. under the trade name Monateric ADA and containing 33% cocoamidopropyl betaine. As shown in Table IV, Test Set C-1, the injection of an aqueous slug containing 1% (active) of Monateric ADA between two $CO_2$ slugs results in increasing tertiary recovery from the less permeable core, from zero with no foaming agent to 65 percent. In another set of experiments, Set C-2 of Table IV, if the Monateric is partially replaced by the lignosulfonate, Marasperse C-21, the foam generated is approximately equally effective in diverting the $CO_2$ flow from the more permeable to the less permeable core, maintaining practically the same level of oil recovery but at a reduced cost.

EXAMPLE 5

The series of experiments described in Example 2 is repeated, using the same surfactant systems, brine, oil, and rock and at the same conditions of temperature and pressure but with a different displacing fluid such as a mixture containing 80 percent by volume carbon dioxide, 12 percent nitrogen, 5 percent methane and 3 percent ethane. The tertiary recovery may change due to the change in the nature of the displacing fluid. However, the relative order of tertiary recovery is similar to that shown in Table IV. The ability of the primary foaming agent to generate effective foam and improve the sweep efficiency of $CO_2$ does not change in the presence of a displacing fluid that contains several components, such as the one used in this example. The ability of Marasperse C-21 to act as a partial replacement for Witcolate does not change with a change in the nature of the displacing fluid. Consequently, recovery trends similar to those shown in Table V are expected.

EXAMPLE 6

The series of experiments described in Examples 2 and 3 is repeated, with the same surfactant systems, brine, oil, and rock but using a different displacing fluid such as nitrogen. If the experiments are carried out at 110° F. and 3500 psi (Examples 2 and 3 were carried out at 105° F. and 2000 psi), then tertiary recovery is expected to change because of the change in the nature of displacing fluid and in the test conditions. However, the relative order of tertiary recovery does not change and remains similar to that described in Tables IV and V. Thus, in the absence of the foaming agent or in the presence of a poor foaming agent, such as Marasperse C-21, the displacing fluid, nitrogen, preferentially flows through the more permeable oil, thereby recovering significant amounts of oil and bypassing the oil in the less permeable core. Again, the injection of a 0.1 pore volume aqueous slug containing 1% Witcolate 1247-H and following it by the nitrogen slug results in the formation of foam in the more permeable core, with increasing resistance to flow there to such an extent that the injected nitrogen flows through the less permeable core and recovers the oil. In addition, if the Witcolate is partially replaced by Marasperse, the generated foam is equally effective so that tertiary recovery remains practically unchanged when compared to that obtained by Witcolate alone in the aqueous slug.

EXAMPLE 7

The tests were made in a manner similar to that described in Example 2. However, these tests were conducted using the parallel arrangement of two West Texas composite carbonate cores whose dimensions and properties are described in Table VI. The fluids used were a West Texas 34° API gravity crude oil and a West Texas synthetic brine. The brine composition is given in Table III. Carbon dioxide was used as the displacing fluid.

The results of these tests, shown in Table VII, were similar to those obtained in Example 2. They show that tertiary recovery was low because of the poor distribution of the injected fluid as demonstrated by the first set of tests. The second and third sets of tests demonstrated that the injection of a 0.1 pore volume aqueous slug containing the foaming agent Alipal CD-128 slug between two $CO_2$ slugs resulted in improved recovery because of the improvement in the distribution of the injected $CO_2$. In addition, the extent of this improvement increased with the foaming agent concentration. The fourth set of tests demonstrated that the primary foaming agent, Alipal CD-128, can be partially replaced by using the cheaper and the less effective Marasperse C-21, yet maintaining the same level of $CO_2$ distribution between the two cores. Consequently, tertiary recovery was also maintained at practically the same level in each of the two cores.

TABLE I

FOAMING ABILITY AND STABILITY OF AQUEOUS SOLUTIONS OF SINGLE AND MIXED SURFACTANTS

| | Concentration, g/100 ml. | | | | Cost of |
|---|---|---|---|---|---|
| Solution Number | Alipal CD-128 (Anionic) | Petrolig ERA-27 | Foam Quality, Percent | Drainage Half-life, Sec. | Surfactant $ Per Pound |
| 1 | 0.0 | 1.0 | 50 | 90 | 0.21 |
| 2 | 0.5 | 0.0 | 78 | 285 | 0.70 |
| 3 | 1.0 | 0.0 | 84 | 315 | 0.70 |
| 4 | 0.5 | 0.5 | 82 | 345 | 0.46 |

TABLE II

DIMENSIONS AND PROPERTIES OF THE BEREA CORES USED IN FLOW TESTS

| | Core A | Core B |
|---|---|---|
| Nominal Dimensions | 2 in. diameter × 1 ft. long | 2 in. diameter × 2 ft. long |
| Pore Volume, cm³ | 150 | 230 |
| Absolute Permeability to Brine, md | 130 | 25 |
| Connate Water Saturation, $S_{wc}$ | 43.7 | 48.0 |
| Residual Oil Saturation, $S_{or}$ | 33.6 | 33.8 |

The important distinction is that core A has a higher permeability and is shorter than core B.

TABLE III

COMPOSITION OF A SYNTHETIC WEST TEXAS RESERVOIR BRINE

| Component | Concentration, g/l |
|---|---|
| Sodium Chloride | 29.2 |
| Calcium Chloride Dihydrate | 7.95 |
| Magnesium Chloride hexahydrate | 4.23 |
| Sodium Bicarbonate | 1.21 |
| Sodium Sulfate | 5.47 |

The solution was acidified to a pH of 5.75. This was achieved by the addition of 1 ml of concentrated hydrochloric acid to a liter of solution.

TABLE IV

RESULTS OF BREA CORES DISPLACEMENT TESTS
Displacing Fluid: $CO_2$
Test Conditions: 104° F. and 2000 psi

| | Concentration, Gram Active Per 100 ml | | Tertiary Recovery, Percent | | Percent of $CO_2$ Flowing |
|---|---|---|---|---|---|
| Test Set | Foaming Agent | Lignosulfonate | Core A (130 md) | Core B (25 md) | Through Core B |
| A. | Witcolate 1257-H | Marasperse C-21 | | | |
| 1 | 0.0 | 0.0 | 95 | 0 | 4 |
| 2 | 0.0 | 1.0 | 95 | 0 | 4 |
| 3 | 0.5 | 0.0 | 95 | 74 | 28 |
| 4 | 1.0 | 0.0 | 100 | 91 | 44 |
| 5 | 0.5 | 0.5 | 100 | 87 | 47 |
| B. | Igepal CO-887 | Petrolig ERA-27 | | | |
| 1 | 1.0 | 0.0 | 95 | 75 | 32 |
| 2 | 0.5 | 0.5 | 95 | 70 | 35 |
| C. | Monateric ADA | Marasperse C-21 | | | |
| 1 | 1.0 | 0.0 | 95 | 65 | 30 |

TABLE IV-continued

RESULTS OF BREA CORES DISPLACEMENT TESTS
Displacing Fluid: $CO_2$
Test Conditions: 104° F. and 2000 psi

| Test Set | Concentration, Gram Active Per 100 ml | | Tertiary Recovery, Percent | | Percent of $CO_2$ Flowing Through Core B |
|---|---|---|---|---|---|
| | Foaming Agent | Lignosulfonate | Core A (130 md) | Core B (25 md) | |
| 2 | 0.5 | 0.5 | 95 | 65 | 30 |

TABLE V

RESULTS OF CORE DISPLACEMENT TESTS
Displacing fluid composition, by volume:
80% $CO_2$, 12% $N_2$, 5% $CH_4$ and 3% $C_2H_6$

| Test Set | Concentration, g/100 ml | | Percent Residual Oil Recovered | |
|---|---|---|---|---|
| | Witcolate 1247-H | Marasperse C-21 | Core A (130 md) | Core B (25 md) |
| 1 | 0.0 | 0.0 | 70 | 0 |
| 2 | 0.0 | 0.0 | 70 | 0 |
| 3 | 1.0 | 0.0 | 75 | 65 |
| 4 | 0.5 | 0.5 | 75 | 65 |

TABLE VI

DIMENSIONS AND PROPERTIES OF THE WEST TEXAS
CARBONATE CORES USED IN FLOW TESTS

| | Core C | Core D |
|---|---|---|
| Nominal Dimensions | 2 in diameter × 2 ft long | 2 in diameter × 2 ft long |
| Pore Volume, $Cm^3$ | 265 | 227 |
| Absolute Permeability to Brine, md | 25 | 7 |
| Connate Water Saturation $S_{wc}$ | 42.6 | 40.3 |
| Residual Oil Saturation $S_{or}$ | 26.7 | 28.4 |

Properties were determined at 2000 psi and 104° F.

TABLE VII

RESULTS OF CARBONATE CORES
DISPLACEMENT TESTS
Displacing Fluid: $CO_2$
Test Conditions: 2000 psi and 104° F.

| Test Set | Concentration, Gram Active per 100 ml. | | Tertiary Recovery, Percent | | Percent of $CO_2$ Flowing Through Core D |
|---|---|---|---|---|---|
| | Alipal CD-128 | Marasperse C-21 | Core D (25 md) | Core D (7 md) | |
| 1 | 0.0 | 0.0 | 65.4 | 15.8 | 24.6 |
| 2 | 0.75 | 0.0 | 70.1 | 35.4 | 32.4 |
| 3 | 1.25 | 0.0 | 85.0 | 77.4 | 52.8 |
| 4 | 0.75 | 0.50 | 85.2 | 81.6 | 53.3 |

I claim:

1. A process, including sweep improvement, for recovering oil from a subterranean oil-bearing formation, comprising:
    (a) injecting a displacing fluid into said formation through an injection well, wherein said fluid flows through regions of least flow resistance, contacting oil therein and displacing it toward a production well, and producing such displaced oil from said production well,
    (b) monitoring the displacing fluid/displaced oil ratio and discontinuing the injection of displacing fluid when the volume of displaced fluid-to-volume of displaced oil produced reaches a predetermined value,
    (c) injecting an aqueous slug comprising a mixed surfactant of
        (1) at least one surfactant foaming agent selected from the group consisting of anionic, non-ionic, and amphoteric surfactants having foam-producing characteristics, and
        (2) a lignosulfonate foaming agent, said aqueous slug flowing through regions of least flow resistance, comparable to the flow pattern of the displacing fluid,
    (d) resuming injection of the displacing fluid, such that the newly-injected displacing fluid contacts and disperses throughout the aqueous mixed system slug, generating foam, and wherein the sum of the values of the characteristics of foam quality and foam stability of the foam generated by said mixed surfactant system exceeds the sum of the values of the characteristics of foam quality and foam stability of the foams formed by the action of the individual components (1) and (2) above, based on the concentration by weight of the components employed, with the foam resulting from the interaction of the displacing fluid and the aqueous mixed surfactant system producing an increase in flow resistance to said displacing fluid in regions previously having least flow resistance, such that said displacing fluid flows through regions which prior to the generation of foam had a higher flow resistance than the resistance of the regions of least flow resistance referred to in part (c), above, thus contacting and displacing additional quantities of oil toward a production well and improving the sweep efficiency of the process, and,
    (e) recovering the displaced oil from said production well.

2. The method of claim 1, wherein the displacing fluid is selected from the group consisting of carbon dioxide, nitrogen, air, methane, ethane, propane, butane, hydrogen sulfide, flue gas, and steam.

3. The method of claim 1, wherein the ratio of the displacing fluid slug volume to the aqueous slug volume varies from about 100:1 to about 1:1.

4. The method of claim 1, wherein, in the mixed surfactant system, the weight ratio of surfactant foaming agent to lignosulfonate foaming agent varies from about 10:1 to about 1:10.

5. The method of claim 1, wherein, in the aqueous slug, concentration of the mixed surfactant system varies from about 0.01% (w/v) to about 10% (w/v).

6. The method of claim 1, wherein the displacing fluid is selected from carbon dioxide, nitrogen, and air.

7. The method of claim 1, wherein the ratio of the displacing fluid slug volume to the aqueous slug volume varies from about 20:1 to about 1:1.

8. The method of claim 1, wherein, in the mixed surfactant system, the weight ratio of surfactant foaming agent to lignosulfonate foaming agent varies from about 4:1 to about 1:4.

9. The method of claim 1, wherein, in the aqueous slug, the concentration of the mixed surfactant system varies from about 0.1% (w/v) to about 10% (w/v).

10. A process, including sweep improvement, for recovering oil from a subterranean oil-bearing formation comprising:
 (a) injecting a displacing fluid selected from the group consisting of carbon dioxide, nitrogen, and air into a subterranean oil-bearing formation through an injection well, such that the displacing fluid flows through regions of least flow resistance, contacting oil and displacing it toward a production well and producing said displaced oil from a production well,
 (b) monitoring the displacing fluid/displaced oil volume ratio and discontinuing the injection of displacing fluid when this ratio reaches a predetermined value,
 (c) injecting an aqueous slug comprising a mixed surfactant of
  (1) at least one foaming agent selected from the group consisting of anionic, nonionic, and amphoteric surfactants having foam-producing characteristics, and
  (2) a lignosulfonate foaming agent,
 wherein the sum of the properties of foam quality and foam stability of a foam generated from said mixed surfactant system exceeds the sum of the properties of foam quality and foam stability generated by the action of the individual components (1) and (2), based on the concentration by weight of the components employed,
 said aqueous slug flowing through regions of least flow resistance, comparable to the flow pattern of said displacing fluid, and wherein
  (A) in the mixed surfactant system, the weight ratio of surfactant foaming agent/lignosulfonate foaming agent varies from about 4:1 to about 1:4, and
  (B) in the aqueous slug, the concentration of the mixed surfactant system varies from about 0.1% w/v to about 10% w/v,
 (d) injecting displacing fluid, wherein the newly-injected displacing fluid contacts and disperses throughout the aqueous mixed surfactant slug, generating foam, said foam resulting in an increase in flow resistance in the regions previously at least flow resistance such that the displacing fluid flows through regions which prior to the generation of the foam had a higher flow resistance than the resistance of the regions of least flow resistance referred to in part (c), above, contacting and displacing additional oil toward a producing well, thus improving sweep efficiency, and wherein the ratio of displacing fluid slug volume/aqueous slug volume varies from about 20:1 to about 1:1, and
 (e) recovering the displaced oil from a producing well.

11. The method of sweep improvement in an operation involving enhanced oil recovery from a subterranean oil-bearing formation, comprising:
 (a) injecting, through an injection well into a subterranean oil-bearing formation, an aqueous slug comprising a mixed surfactant system of
  (1) at least one foaming agent selected from the group consisting of anionic, nonionic, and amphoteric surfactants having foam-producing properties, and
  (2) a lignosulfonate foaming agent,
 (b) injecting displacing fluid into said formation through said injection well, with said fluid interacting with said mixed surfactant system to form foam and displacing the oil therein toward a production well, and,
 (c) recovering the displaced oil through the production well.

12. The method of claim 11, wherein the weight ratio of the surfactant foaming agent to the lignosulfonate foaming agent is about 1:1.

13. The method of claim 11, wherein the volume of the aqueous slug of the volume surfactant system is about 5 vol.% of the pore volume of the area from which the oil is to be displaced.

14. The method of sweep improvement in an operation involving enhanced oil recovery from a subterranean oil-bearing formation, comprising:
 (a) injecting into said formation, through an injection well, an aqueous slug comprising a mixed surfactant system of
  (1) at least one surfactant foaming agent selected from the group consisting of anionic, nonionic, and amphoteric surfactants having foam-producing properties, and
  (2) a lignosulfonate foaming agent,
 wherein the sum of the properties of foam quality and foam stability of a foam generated from said mixed surfactant system exceeds the sum of the properties of foam quality and foam stability generated from the individual components employed,
 (b) injecting displacing fluid into said formation through said injection well, thus forming a foam, and displacing oil toward a production well, and
 (c) recovering the displaced oil through the production well.

15. An enhanced oil recovery method, including sweep improvement, for the recovering of oil from a subterranean oil-bearing formation, comprising:
 (a) injecting a displacing fluid into said formation through an injection well, displacing oil from said formation toward a production well and collecting said displaced oil from the production well,
 (b) monitoring the displacing fluid/displaced oil ratio and discontinuing the injection of displacing fluid when said ratio reaches a predetermined value,
 (c) injecting, into said formation through said injection well, an aqueous slug comprising a mixed surfactant of
  (1) at least one surfactant foaming agent selected from the group consisting of anionic, non-ionic, and amphoteric surfactants having foam-producing characteristics, and
  (2) a lignosulfonate foaming agent,
 said aqueous slug flowing through regions at least flow resistance, comparable to the flow pattern of the displacing fluid,
 (d) resuming injection of the displacing fluid into the formation through the injection well, thus forming foam and displacing oil in the formation toward a production well, and,
 (e) recovering the displaced oil from said production well.

16. The method of claim 15, wherein the weight ratio of the surfactant foaming agent to the lignosulfonate foaming agent is about 1:1.

17. An enhanced oil recovery method, including sweep improvement, for the recovering of oil from a subterranean oil-bearing formation, comprising:
  (a) injecting a displacing fluid into said formation through an injection well, contacting and displacing oil from said formation toward a production well, and producing said displaced oil from the production well,
  (b) monitoring the displacing fluid/displaced oil ratio produced at the production well, and discontinuing the injection of displacing fluid when said ratio reaches a predetermined value,
  (c) injecting, into said formation through said injection well, an aqueous slug comprising a mixed surfactant system of
    (1) at least one surfactant foaming agent selected from the group consisting of anionic, non-ionic, and amphoteric surfactants having foam-producing characteristics, and
    (2) a lignosulfonate foaming agent,
  (d) resuming injection of the displacing fluid into the formation through the injection well, wherein the sum of the properties of foam quality and foam stability of a foam generated from said mixed surfactant system exceeds the sum of the properties of foam quality and foam stability generated by the action of the individual components (1) and (2), based on the concentration by weight of the components employed, and,
  (e) recovering the displaced oil from said production well.

18. A method of sweep improvement in an operation involving oil recovery from a subterranean oil-bearing formation, comprising:
  (a) injecting, through an injection well into said formation, an aqueous slug comprising from about 0.1 wt.% to about 10 wt.%, of the ammonium salt of ethoxylate sulfate surfactant foaming agent and ammonium lignosulfonate foaming agent, wherein the weight ratio of ammonium ethoxylate to ammonium lignosulfonate is from about 4:1 to about 1:4,
  (b) injecting displacing fluid comprising carbon dioxide into said formation through said injection well, thus forming a foam, and displacing oil toward a production well, and
  (c) recovering the displaced oil through the production well.

19. A method of sweep improvement in an operation involving oil recovery from a subterranean oil-bearing formation, comprising:
  (a) injecting, through an injection well into said formation, an aqueous slug comprising from about 0.1 wt.% to about 10 wt.%, of nonyl phenoxy poly(ethyleneoxy)ethanol surfactant foaming agent and ammonium lignosulfonate foaming agent, wherein the substituted ethanol/lignosulfonate weight ratio is from about 4:1 to about 1:4,
  (b) injecting displacing fluid comprising carbon dioxide into said formation through said injection well, thus forming a foam, and displacing oil toward a production well, and
  (c) recovering the displaced oil through the production well.

20. A method of sweep improvement in an operation involving oil recovery from a subterranean oil-bearing formation, comprising:
  (a) injecting, through an injection well into said formation, an aqueous slug comprising from about 0.1 wt.% to about 10 wt.%, of cocoamidopropyl betaine surfactant foaming agent and ammonium lignosulfonate foaming agent, wherein the weight ratio of betaine to lignosulfonate is from about 4:1 to about 1:4,
  (b) injecting a displacing fluid comprising carbon dioxide into said formation through said injection well, thus forming foam, and displacing oil therein toward a production well, and
  (c) recovering the displaced oil through the production well.

21. A method of sweep improvement in an operation involving oil recovery from a subterranean oil-bearing formation, comprising:
  (a) injecting, through an injection well into a subterranean oil-bearing formation, an aqueous slug comprising a mixed surfactant system of
    (1) at least one foaming agent selected from the group consisting of anionic, nonionic, and amphoteric surfactants having foam-producing characteristics, and
    (2) a lignosulfonate foaming agent,
    wherein the aqueous portion of the aqueous slug comprises reservoir brine,
  (b) injecting displacing fluid into said formation through said injection well, thus forming foam, and displacing oil therein toward a production well, and,
  (c) recovering the displaced oil from said production well.

22. An enchanced oil recovery method including sweep improvement for the recovery of oil from a subterranean oil-bearing formation, comprising:
  (a) injecting a displacing fluid into said formation through an injection well, displacing oil from said formation toward a production well, and collecting said displaced oil from the production well,
  (b) monitoring the displacing fluid/displaced oil ratio, and discontinuing the injection of displacing fluid when said ratio reaches a predetermined value,
  (c) injecting, into said formation through said injection well, an aqueous slug comprising:
    (1) at least one foaming agent selected from the group consisting of anionic, nonionic, and amphoteric surfactants having foam-producing characteristics,
    (2) a lignosulfonate foaming agent, and
    (3) reservoir brine,
  (d) resuming injection of the displacing fluid into said formation through said injection well and displacing oil in said formation toward a production well, and,
  (e) recovering the displaced oil from the production well.

* * * * *